3,042,712
CARBOXYLIC ACID AMIDES
Ingeborg Hennig, Kelkheim (Taunus), Ernst Lindner, Franfurt am Main, and Heinrich Ott, Eppstein (Taunus), Germany, assignors to Farbwerke Hoechst Aktiengesellschaft vormals Meister Lucius & Bruning, Frankfurt am Main, Germany, a corporation of Germany
No Drawing. Filed July 28, 1959, Ser. No. 829,973
Claims priority, application Germany Aug. 8, 1958
6 Claims. (Cl. 260—490)

According to Rekker and Nauta (Recueil 70, page 241 (1951) α-hydroxy-isobutyric acid-mono-alkylamides can be prepared by hydrolysis of the corresponding oxazolidine-diones. Barrée (Annales de Chimie et de Physique [10] 9, page 223 (1928)) obtained α-ethyl-α-hydroxy-butyric acid diethylamide by reaction of oxalic acid ethyl ester diethylamide with ethyl magnesium halide.

The present invention relates to new carboxylic acid amides corresponding to the general formulae

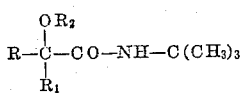

and

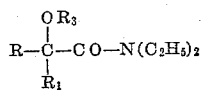

in which R and $R_1$ represent equal or unequal, straight-chain or branched alkyl radicals with 2 or 3 carbon atoms, $R_2$ is hydrogen or a low molecular aliphatic carboxylic acid radical and $R_3$ is a low molecular weight aliphatic carboxylic acid group. These amides are distinguished by good analeptic properties, in particular by breathing analeptic activity and also to corresponding pharmaceutical preparation which contain these compounds as active substance, if desired in admixture with the usual pharmaceutical carrier substances.

The present invention relates also to the preparation of the new carboxylic acid amides corresponding to the above formula which are obtained in a good yield if:

(a) α-acyloxy- or α-hydroxy-carboxylic acids of the general formula

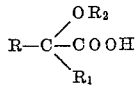

in which R, $R_1$ and $R_2$ have the meanings given above, or their reactive functional derivatives, are reacted with amines of the general formula H—X, in which X has the meaning given above, and, if desired, an acyl group being present in α-position, is split off in usual manner, (b) α-amino-carboxylic acid amides of the above general formula, in which —$OR_2$ is replaced by the amino group, are transformed by means of nitrous acid into α-hydroxy-carboxylic acid amides, (c) α-oxo-carboxylic acid amides or oxalic acid derivatives, the one carboxy group of which is bound acid amide-like according to the above formula, are reacted with alkyl-magnesium-halides, (d) substituted oxazolidine-diones of the general Formula II

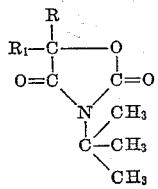

in which R and $R_1$ have the meanings given above, are transformed by hydrolysis into carboxylic acid amides of the above general formula, in which $R_2$ stands for hydrogen and the other radicals have the meanings given above, and, if desired, compounds of the above general Formula I, in which $R_2$ stands for hydrogen, are acylated in known manner in the sense of the meaning of $R_2$.

The reaction of reactive α-hydroxy-carboxylic acid derivatives or of the corresponding compounds acylated in α-position with the corresponding amines represents a generally applicable process for the preparation of the products according to the invention. As α-hydroxy-carboxylic acids there may be mentioned: α-ethyl-α-hydroxy-butyric acid, α-isopropyl-α-hydroxy-butyric acid, α-ethyl-α-hydroxy-valeric acid, α-n-propyl-α-hydroxy-valeric acid, α-ethyl-α-hydroxy-isovaleric acid, α-n-propyl-α-hydroxy-isovaleric acid, α-isopropyl-α-hydroxy-isovaleric acid. The α-hydroxy group of these compounds can, for example, be esterified with the following carboxylic acids: formic acid, acetic acid, propionic acid, butyric acid, isobutyric acid, valeric acid or isovaleric acid.

As α-hydroxy-carboxylic acid derivatives there are used with particular advantage the corresponding acid halides, preferably the acid chlorides or bromides, which are suitably esterified in α-position with the above-mentioned carboxylic acids. These halides are reacted in known manner with suitable amines, preferably in the presence of an inert solvent such as ether, benzene, or methylene chloride. As amines there may be used diethylamine and tertiary butylamine. Mostly, the reaction of these amines with the aforementioned carboxylic acid halides takes place already in the cold. It is of advantage to add to the reaction mixture an agent splitting off hydrogen halide; as such there may be used with paritcular advantage a second molecular proportion of the amine to be reacted or also tertiary organic bases such as triethylamine and pyridine; it is also possible to operate in the presence of inorganic basic compounds, for example alkali metal carbonates, alkaline earth metal carbonates or the corresponding hydroxides. The products are worked up in the usual manner, suitably by sucking off the amine salt formed and fractional distillation of the filtrate. In cases in which the reaction product is obtained in solid form, it generally suffices to recrystallize the product once. For preparation of α-hydroxy-carboxylic acid amides the α-acyloxy group can subsequently be hydrolized in usual manner, preferably in an alkaline medium.

As suitable carboxylic acid derivatives there may also be used the esters of the above-mentioned hydroxy- or acyloxy-carboxylic acids, preferably low molecular alkyl esters. The reaction is effected by a prolonged action of the two reaction components upon each other, for example, by allowing the reaction mixture to stand for a prolonged time at slightly raised temperature (about 30–50° C.), if desired in the presence of suitable solvents. When using esters with a high molecular alkyl radical, methanol is particularly suitable as solvent, in which case the corresponding methyl esters are formed intermediarily by reesterification. The products are preferably worked up by fractional distillation or by distilling off the solvent and the excess of the reaction components and by recrystallization of the solid residue. It is also possible to start directly from α-acyloxy-carboxylic acid esters and, after aminolysis, to transform these hydrolytically into α-hydroxy-carboxylic acid amides. On the other hand, it is also possible to start from α-hydroxy-carboxylic acid esters and, after aminolysis, to acylate these compounds in usual manner.

For the preparation of the products according to the invention it is also possible to start from branched α-aminocarboxylic acid amides and to transform these into the desired α-hydroxy-carboxylic acid amides with the aid of nitrous acid (for example obtained in the reaction medium by the action of dilute acids on sodium nitrite).

Another favorable method of executing the process for the preparation of branched α-hydroxy-carboxylic acid amides consists in reacting oxalic acid derivatives with alkyl magnesium halides. It is of advantage to use oxalic acid derivatives, the one carboxylic acid group of which shows already the desired amide configuration. The other carboxyl group has preferably been transformed into a lower alkyl ester group. When one molecular proportion of the Grignard compound is reacting and when carefully working in the cold there are chiefly obtained α-oxo-carboxylic acid amides; when an excess of the Grignard compound is further reacting and when heating for 10 to 15 hours, the α-keto group is reduced to the tertiary hydroxy group, in which case the α-branching is simultaneously introduced by the alkyl radical of the Grignard compound. Naturally, the reaction can also be carried out in one step to the branched carboxylic acid amide without isolation of the α-oxo-carboxylic acid amide first being formed. As amides of oxalic acid esters there may be mentioned as starting substances: oxalic acid ethyl ester diethylamide, oxalic acid ethyl ester tertiary butylamide and all oxalic acid alkyl esters showing as amide component one of the two mentioned amide groups. As Grignard compounds there may for example be used ethyl-magnesium bromide, n-propyl-magnesium bromide, isopropyl-magnesium bromide. It is of special advantage to use n-propyl- and isopropyl-magnesium bromide, oxalic acid ethyl ester diethylamide and -tertiary butylamide. In order to achieve a complete reaction it is recommendable to distill off to a large extent the ether as solvent in the preparation of the Grignard compounds and to introduce a higher boiling solvent, for example benzene or toluene, in order to attain a higher reaction temperature. The products are worked up in a manner usual for Grignard compounds, by adding dilute acids, elimination of the reaction product obtained, for example by extraction with ether, and subsequent fractional distillation or crystallization.

Another possibility of preparing monosubstituted α-hydroxy-carboxylic acid amides consists in the hydrolysis of correspondingly substituted oxazolidine-dione derivatives according to the directions given by Rekker and Nauta (Rec. 70, 241 (1951)). As starting substances for these reactions there may for example be used: 3-tertiary butyl-5,5-diethyloxazolidine-dione-(2,4), 3-tertiary butyl-oxazolidine-dione-(2,4) whose carbon atom in 5-position is substituted by equal or unequal alkyl radicals with 2 to 3 carbon atoms. The hydrolysis is advantageously effected with the aid of dilute alkali. The reaction proceeds according to the following scheme:

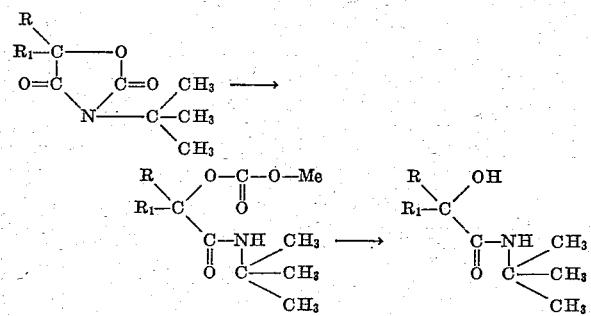

Naturally, this reaction is only suitable for the preparation of α-hydroxy-carboxylic acid tertiary butylamides since a NH-group is formed during the hydrolysis of the oxazolidine-dione.

In all cases in which α-hydroxy-carboxylic acid amides are obtained these can be transformed by acylating in usual manner into the corresponding products of the above general formula, in which $R_2$ represents an acyl radical. As acylating agents there are used acetic anhydride, propionic anhydride, acetyl chloride, propionyl chloride and the halides of branched or unbranched butyric- or valeric acids. When using halides the reaction mostly proceeds spontaneously. When using acid anhydrides it is advantageous to boil for a prolonged time under reflux, if necessary in the presence of a suitable catalyst such as concentrated sulfuric acid or sodium acetate, and to use pyridine and other organic bases as solvent. The products are worked up in known manner by fractional distillation and, if desired, by crystallization of the products obtained.

The compounds obtained according to the process of the invention are valuable medicaments which apart from being only insignificantly toxic, are characterized by good pharmacological properties and represent effective analeptics. They produce above all a strong analeptic action on the respiratory center. The intravenous injection of 20 mg./kg. of α-propionoxy-α-ethyl-butyric acid diethylamide in the rabbit removes the suppression of breathing caused by intravenous injection of 8 mg./kg. of morphine. The suppression of the breathing caused by intravenous injection of 3 mg./kg. of the known mixture of 2-dimethylamino-4,4-diphenyl-heptanone-(5) hydrochloride and diphenyl-piperidino-ethyl-acetamide hydrochloride is likewise removed and the initial breathing is restored by intravenous injection of 15 mg./kg. of α-propionoxy-α-ethyl-butyric acid diethylamide. The analeptic action produced by intravenous injection of 25–30 mg./kg. of α-propionoxy-α-ethyl-butyric acid diethylamide on the suppression of the breathing caused by intravenous injection of 30 mg./kg. of bromo-propenyl-isobutyl-barbituric acid was very evident. The lethal dose of this product of the invention when intravenously injected amounts to 40 mg./kg.

In contradistinction thereto, the afore-mentioned α-hydroxy-isobutyric acid amides, for example the α-hydroxy-isobutyric acid-tertiary-butylamide, do not show any breathing analeptic or physically stimulating properties. When administered intravenously to the mouse, its lethal dose amounts to 600 mg./kg.

The following examples illustrate the invention but they are not intended to limit it thereto:

EXAMPLE 1

*α-Ethyl-α-Acetoxy-Butyric Acid Diethylamide*

50 grams of α-ethyl-α-hydroxy-butyric acid diethylamide are boiled under reflux for 3 hours with 300 cc. of acetic anhydride and 10 grams of freshly molten sodium acetate. After concentration under reduced pressure the residue is diluted with water, whereupon an oil deposits. After extraction with methylene chloride, washing of the methylene chloride solution with sodium bicarbonate and water, the product is dried with sodium sulfate. After distilling off the methylene chloride the residue is distilled. There are obtained 42 grams of α-ethyl-α-acetoxy-butyric acid diethylamide boiling at 66° C. under a pressure of 0.3 mm. of mercury.

C: calculated, 62.7; found, 62.7.
H: calculated, 10.05; found, 10.3.
N: calculated, 6.1; found, 6.0.

EXAMPLE 2

*α-Ethyl-α-n-Propionoxy-Butyric Acid Diethylamide*

20 cc. of propionyl chloride are added to 20 grams of α-ethyl-α-hydroxy-butyric acid diethylamide. After warming on the steam bath, vivid reaction and evolution of gaseous hydrogen chloride set in. After heating for one hour on the steam bath, the reaction mixture is subjected to fractional distillation. There are obtained 19 grams of α-ethyl-α-n-propionoxy-butyric acid diethylamide boiling at 80° C. under a pressure of 0.4 mm. of mercury.

N: calculated, 5.75; found, 5.9.
O: calculated, 19.75; found, 19.4.

In analogous manner there are obtained from 40 grams of α-hydroxy-α-ethyl-butyric acid tertiary-butylamide and 30 grams of acetyl chloride 32 grams of α-acetoxy-α-ethyl-butyric acid tertiary butylamide melting at 61–62° C.

EXAMPLE 3

*α-n-Propyl-α-Hydroxy-Valeric Acid Diethylamide*

To a Grignard solution prepared from 33 grams of magnesium and 240 grams of n-propyl iodide in ether there are added 300 cc. of benzene. Ether is distilled off until the boiling point of the solvent mixture rises to about 70° C. After adding 45 grams of oxalic acid ethyl ester diethylamide and boiling for 10 hours under reflux the reaction mixture is allowed to cool, poured on ice and acidified with acetic acid of 50% strength. The organic phase is extracted with ether and washed, the solvent mixture is dried and concentrated under reduced pressure. There are obtained 30 grams of α-n-propyl-α-hydroxy-valeric acid diethylamide boiling at 88–90° C. under a pressure of 0.45 mm. of mercury.

In analogous manner there is obtained from isopropyl-magnesium bromide and oxalic acid ethyl ester diethylamide α-isopropyl-α-hydroxy-isovaleric acid diethylamide boiling at 70–90° C. under a pressure of 0.05 mm. of mercury. The compound solidifies after distillation. Upon recrystallisation from ethyl acetate it melts at 93–95° C.

From oxalic acid ethyl ester tertiary butylamide there is obtained in analogous manner α-isopropyl-α-hydroxy-isovaleric acid tertiary butylamide melting at 132–133° C.

From oxalic acid ethyl ester tertiary butylamide and ethyl magnesium bromide there is obtained in analogous manner α-ethyl-α-hydroxy-butyric acid tertiary butyl-amide melting at 80–82° C.

From oxalic acid ethyl ester tertiary butylamide and n-propyl magnesium bromide there is obtained in anologous manner α-n-propyl-α-hydroxy-valeric acid tertiary butylamide boiling at 93–96° C. under a pressure of 1 mm. of mercury.

EXAMPLE 4

*α-n-Propionoxy-α-n-Propyl-Valeric Acid Diethylamide*

20 grams of α-n-propyl-α-hydroxy-valeric acid diethylamide prepared according to Example 3 and 25 grams of n-propionyl chloride are heated for 2 hours on the steam bath. After the evolution of gaseous hydrogen chloride has ceased the reaction mixture is concentrated and distilled. There are obtained 15 grams of α-n-propionoxy-α-n-propyl-valeric acid diethylamide boiling at 80–86° C. under a pressure of 0.1 mm. of mercury.

C: calculated, 66.5; found, 66.8.
H: calculated, 10.7; found, 10.7.
N: calculated, 5.15; found, 5.1.

EXAMPLE 5

*α-Ethyl-α-Acetoxy-Butyric Acid Diethylamide*

A solution of 15 grams of diethylamine in 50 cc. of ether is added dropwise to a solution of 19.2 grams of α-acetoxy-α-ethyl-butyric acid chloride in 100 cc. of ether. After the diethylamine hydrochloride is filtered off with suction the ether solution is concentrated under reduced pressure. The above residue is distilled under reduced pressure. There are obtained 15 grams of α-ethyl-α-acetoxy-butyric acid diethylamide boiling at 65–68° C. under a pressure of 0.3 mm. of mercury.

EXAMPLE 6

*α-Ethyl-α-Hydroxy-Butyric Acid Tertiary Butylamide*

18.6 grams of α-amino-α-ethyl-butyric acid tertiary butylamide (prepared from α-bromo-butyric acid tertiary butylamide and ammonia) are dissolved in 200 cc. of 2 N-hydrochloric acid. A solution of 7 grams of sodium nitrite in a little water is added thereto. After heating for a short time evolution of nitrogen sets in. After its termination the reaction mixture is neutralized with solid potassium carbonate. After extraction with methylene chloride, drying and distilling off the solvent, the residue is recrystallized from ethyl acetate. There are obtained 8 grams of α-ethyl-α-hydroxy-butyric acid tertiary butylamide melting at 80–82° C.

EXAMPLE 7

*α-Ethyl-α-Hydroxy-Butyric Acid Tertiary Butylamide*

10 grams of 3-tertiary butyl-5,5-diethyl-oxazolidine-dione (prepared according to Spielmann, J. Am. Chem. Soc. 66, page 1244 (1942)) are stirred for 3 hours at room temperature with 100 cc. of 2 N-sodium hydroxide solution. The solution is extracted with ether. After drying and distilling off the solvent there are obtained 6 grams of α-ethyl-α-hydroxy-butyric acid tertiary butylamide melting at 80–81° C.

We claim:
1. A carboxylic acid amide selected from the group consisting of

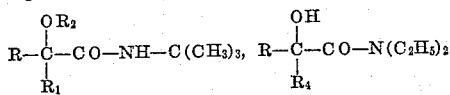

and

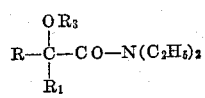

in which R and $R_1$ represent alkyl groups containing from 2 to 3 carbon atoms, $R_2$ is a member of the group consisting of hydrogen, acetoxy, and propionoxy, $R_3$ is a member of the group consisting of acetoxy and propionoxy and $R_4$ represents an alkyl radical containing 3 carbon atoms.

2. α-ethyl-α-n-propionoxy-butyric acid diethylamide.
3. α-acetoxy-α-ethyl-butyric acid tertiary butylamide.
4. α-n-propyl-α-hydroxy-valeric acid diethylamide.
5. α-isopropyl-α-hydroxy-isovaleric acid diethylamide.
6. α-n-propionoxy-α-n-propyl-valeric acid diethylamide.

References Cited in the file of this patent

UNITED STATES PATENTS

| | | |
|---|---|---|
| 2,666,783 | Lytton | Jan. 19, 1954 |
| 2,700,616 | Fein | Jan. 25, 1955 |
| 2,845,452 | Morel | July 29, 1958 |
| 2,904,469 | Nashed | Sept. 15, 1959 |
| 2,906,666 | Wirth | Sept. 29, 1959 |